(12) United States Patent
Davitz et al.

(10) Patent No.: US 8,630,627 B2
(45) Date of Patent: Jan. 14, 2014

(54) METHOD AND APPARATUS FOR PROCESSING MESSAGES IN A SOCIAL NETWORK

(75) Inventors: Jeffrey Davitz, Danville, CA (US); Sugato Basu, Redwood City, CA (US); Jiye Yu, Menlo Park, CA (US); David Gutelius, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 1749 days.

(21) Appl. No.: 11/671,943

(22) Filed: Feb. 6, 2007

(65) Prior Publication Data

US 2007/0203996 A1    Aug. 30, 2007

Related U.S. Application Data

(60) Provisional application No. 60/773,722, filed on Feb. 14, 2006.

(51) Int. Cl.
*H04M 1/725* (2006.01)

(52) U.S. Cl.
USPC ............ 455/414.1; 455/412.1; 455/412.2; 455/414.2; 455/550.1; 455/456.3; 709/206; 709/208; 709/219; 379/88.11; 379/88.22; 379/88.23

(58) Field of Classification Search
USPC ........... 455/456.1–457, 412.1–412.2, 414.1, 455/418, 414.2, 419, 456.3, 550.1, 556.2; 707/104.1, 1, 3, 10, 202; 709/223–224, 709/216, 208, 102, 239, 206, 219; 370/328, 370/338, 245, 329; 379/88.11, 88.23, 88.22
See application file for complete search history.

(56) References Cited

U.S. PATENT DOCUMENTS

| | | | |
|---|---|---|---|
| 6,212,521 B1 * | 4/2001 | Minami et al. | 707/613 |
| 7,284,264 B1 * | 10/2007 | Kim et al. | 726/2 |
| 2005/0283497 A1 * | 12/2005 | Nurminen et al. | 707/104.1 |
| 2007/0161382 A1 * | 7/2007 | Melinger et al. | 455/456.1 |
| 2008/0046516 A1 * | 2/2008 | Hyoung et al. | 709/205 |

* cited by examiner

*Primary Examiner* — Vladimir Magloire
*Assistant Examiner* — Babar Sarwar

(57) ABSTRACT

In one embodiment, the present invention is a method and apparatus for knowledge generation and deployment in a distributed network. In one embodiment, a method for processing messages in a social network includes receiving a new message from a first node in the network, the new message including a query, providing the first node with an answer to the query, if the answer is located in a repository, and initiating generation of the answer, if the answer is not located in the repository.

25 Claims, 6 Drawing Sheets

METHOD AND APPARATUS FOR PROCESSING MESSAGES IN A SOCIAL NETWORK

CROSS REFERENCE TO RELATED APPLICATIONS

This application claims the benefit of U.S. Provisional Patent Application No. 60/773,722, filed Feb. 14, 2006, which is herein incorporated by reference in its entirety.

REFERENCE TO GOVERNMENT FUNDING

This invention was made with Government support under Contract No. NBCHD030010, awarded by the Department of the Interior, National Business Center. The Government has certain rights in this invention.

FIELD OF THE INVENTION

The present invention relates generally to distributed networks and relates more particularly to the generation and deployment of knowledge in distributed networks.

BACKGROUND OF THE INVENTION

The emergence of the World Wide Web has brought to attention yet another "web"—the social web. While social sciences have extensively studied various aspects of societies and social interactions, current models for studying social networks are not rich enough to analyze several important social phenomena.

One important emerging class of problems in social networks involves relying on real people to answer specific questions. Within this context, one can assume that any two nodes (people) in a social network are connected by short paths (i.e., the so-called "six degrees of separation" property). Moreover, expertise tends to be distributed throughout a social network such that, for any query, there is a node within the network for whom the answer to the query is easily at-hand. Thus, in general, there exists, for most queries, a node on a short path from the query originator who has a good answer to the query. The problem, however, is that while a short path to a query's answer may exist within the social network, that path is typically hard to identify. Moreover, existing applications for searching for content do not provide adequate means for generating new, socially mediated content.

Thus, there is a need in the art for a method and apparatus for knowledge generation and deployment in distributed social networks.

SUMMARY OF THE INVENTION

In one embodiment, the present invention is a method and apparatus for knowledge generation and deployment in a distributed network. In one embodiment, a method for processing messages in a social network includes receiving a new message from a first node in the network, the new message including a query, providing the first node with an answer to the query, if the answer is located in a repository, and routing the message to a first set of relevant nodes for generation of the answer. The nodes who receive the message may respond to the message by providing an answer, by forwarding the message to a second set of nodes to generate the answer, by expressing interest in validating future answers or by asking the first node for further clarification.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to a method and apparatus for knowledge generation and deployment in distributed networks, such as networks that are internal to organizations and networks configured over the World Wide Web. Embodiments of the invention learn, and then exploit, patterns of communication (e.g., as expressed in linkages and message contents) in an underlying social network in order to improve searching capabilities within the network. Moreover, the present invention provides a means of validating the answers generated in response to a query posed within a social network.

Thus, embodiments of the present invention provide an automated means for users to perform a social search. A core idea of social search is to "ask someone who knows". This differs from other popular methods of searching for information, such as using Internet search engines, in at least three significant ways. First, rather than just relying on algorithms to find relevant existing information, social search relies on real people answering specific questions. As such, new content may be generated in response to a query. Second, rather than simply modeling existing content, social search models people in the social web (e.g., the users' expertise, response rates on various topics, etc.), where each person is considered a potential content generator. Third, the system also encourages content generation, which allows users to tag or modify a query to help others in locating more relevant information to a given search.

Figure 1:
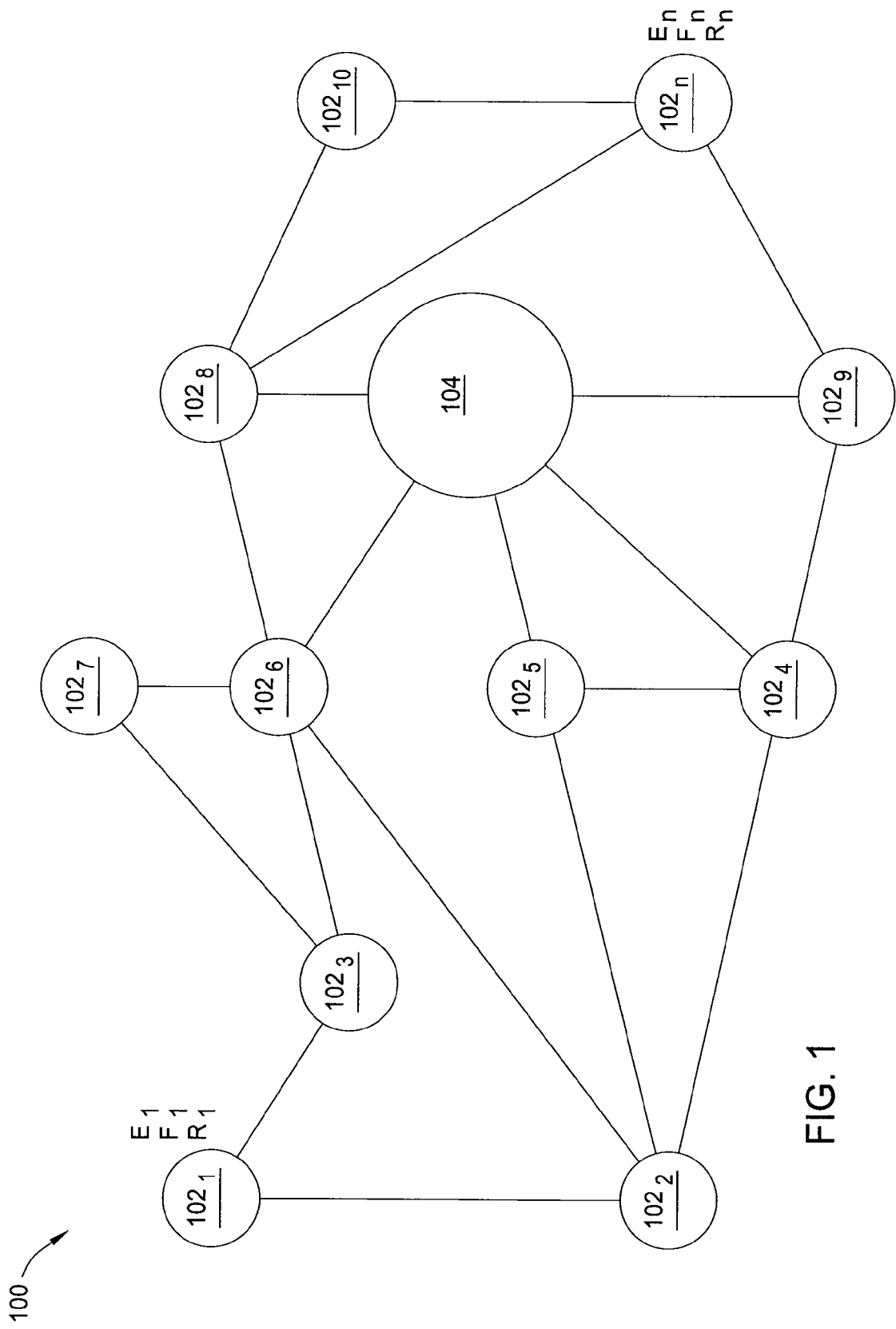
FIG. 1 is a schematic diagram illustrating an exemplary social network within which the present invention may be implemented.

FIG. 1 is a schematic diagram illustrating an exemplary social network 100 within which the present invention may be implemented. As illustrated, the network 100 comprises a plurality of interconnected nodes $102_1$-$102_n$ (hereinafter collectively referred to as "nodes 102"), such that the set, n, of nodes $N=\{N_i\}_{i=1}^n$. As used herein, the term "node" refers to any entity that is reachable and capable of performing functions including query answering and validation and content generation (e.g., an individual person, a community, a web service, etc.).

Each node 102 is associated with a profile. The profile is available locally at each node 102. The profile of the $i^{th}$ node 102 comprises a set of three parameters: (1) an expertise measure, $E_i$, represented by probability distributions $P(T_k|N_i)$ over a global topic set $T=\{T_k\}_{k=1}^l$ (where each individual topic, $T_k$, is, itself, a probability distribution over keyword identifiers, w, and an identifier represents any one or more of a variety of entities, including message keywords or meta-tags, entries in an ontology or the like); (2) a referral rank, $F_i$, that measures the general affinity of other nodes 102 to route messages to the $i^{th}$ node (computed, for example, by iteratively summing the weighted contributions from the scores of the referring nodes); and (3) a response score, $R_i$, which is a function of the response rate and response accuracy of the $i^{th}$ node to incoming messages.

In one embodiment, the referral rank, $F_i$, or the response score, $R_i$, is topic- or subject-based. That is, the referral rank, $F_i$, or the response score, $R_i$, specifies some rank or score that is relative to a specific topic (i.e., rather than an overall or generic score). This is useful when a node 102 may have a low average response rate, but the node's response rate for specific topics may be relatively high. Given a message, m, and a topic set, $T=\{T_k\}_{k=1}^l$ one embodiment uses a probabilistic calculation for generating the message, m, from the topic $T_k$, $P(m|T_k)$. In another embodiment (e.g., where more training data is available), discriminative models for $P(T_k|m)$ are used rather than generative models for $P(m|T_k)$, for example, as described by Ng. et al. in "On Discriminative vs. Generative Classifiers: A Comparison of Logistic Regression and Naïve Bayes" (2001). In this case, given the expertise, $E_i=P(T_k|N_i)$, of a node, $N_i$, one may compute:

$$P(m|E_i)=\Sigma_k P(m|T_k)E_i \quad (\text{EQN. 1})$$

Embodiments of methods for learning node profiles and their parameters are described in further detail below with respect to FIG. 2 (expertise measure, $E_i$) and FIG. 5 (referral rank, $F_i$).

In addition, the network 100 comprises at least one supernode 104. As will be described in further detail below, the supernode 104 is a special type of network node that performs one or more advanced functions. These functions include one or more of: learning the expertise of different people (nodes 102) in the network 100, performing topic- or socially-based routing of messages to relevant people (with a minimum number of network hops), detecting emerging communities of interest in the network 100 (i.e., nodes 102 with common interests) and performing targeted broadcasts of messages with relevant topics to these emerging communities. Thus, the supernode 104 may be thought of as an intermediary that manages message flow through the network 100 by routing messages (e.g., generated by one of the nodes 102) to the nodes 102 that are believed to be the most likely to respond to the message with correct or useful information. To this end, the supernode 104 maintains all necessary system components, including: (1) a database, D, for storing message streams; (2) node profiles (as described above); (3) the global set, T, of all possible topics (i.e., message subjects); and (4) several inverted indices for retrieving answers and node expertise.

In some embodiments, profile information may automatically be available for nodes in a social network. In other embodiments, however, it may be necessary to learn or infer at least initial profile distributions (i.e., of user preferences over the global topic set, T, of social groups a user interacts with, etc.) for the nodes. This is the so-called "cold start" problem. In such a case, these initial profile distributions may be inferred from multiple data sources, including World Wide Web pages, email, documents, organizational charts and the like. This information can also be learned by the supernode over time.

Figure 2:
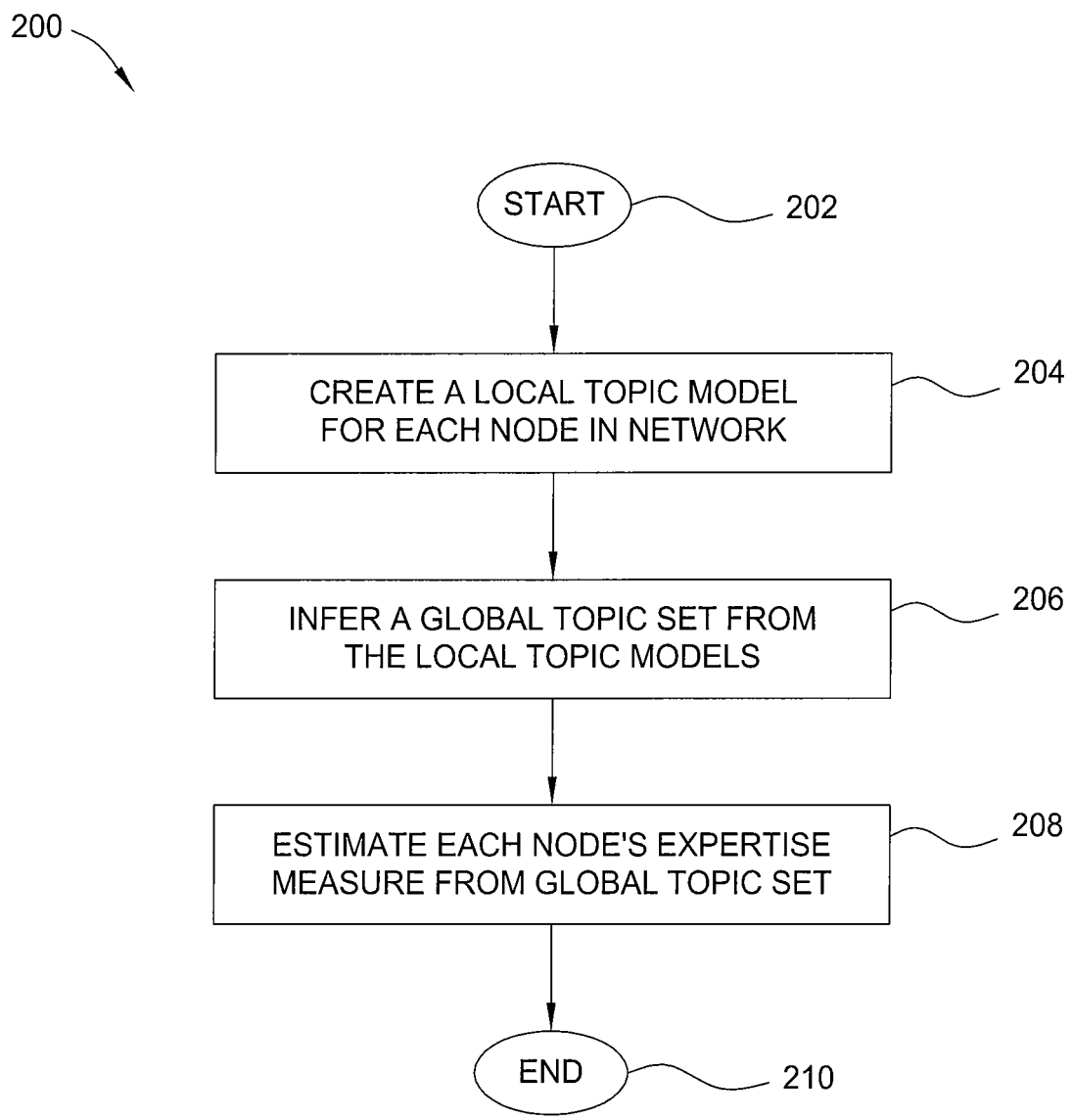
FIG. 2 is a flow diagram illustrating one embodiment of a method for learning the expertise measures of nodes in a social network, according to the present invention.

FIG. 2 is a flow diagram illustrating one embodiment of a method 200 for learning the expertise measures, $E_i$, of nodes, $N_i$, in a social network, according to the present invention. The method 200 may be implemented, for example, at a router or supernode (e.g., such as supernode 104 of FIG. 1) in a social network. The method 200 can also be used to learn additional features about users.

The method 200 is initialized at step 202 and proceeds to step 204, where the method 200 creates local topic models for each individual node. In one embodiment, the local topic models are created based on per-node topic distributions provided by the individual nodes. These distributions may be generated for each node, by creating a local topic model based on, for example, the sent box of a node's email program, for example using Latent Dirichlet Allocation (LDA), as described by Blei et al. in "Latent Dirichlet Allocation", Journal of Machine Learning Research 3 (2003) 993-1022, the Author-Recipient-Topic (ART) model, as described by McCallum et al. in "The Author-Recipient-Topic Model for Topic and Role Discovery in Social Networks: Experiments with Enron and Academic Email", University of Massachusetts Amherst, Technical Report UM-CS-2004-096 (2004) or other offline topic models. In one embodiment, a simpler scalable topic model like spherical KMeans (SPKMeans), such as described by Dhillon et al. in "Efficient Clustering of Very Large Document Collections", Data Mining for Scientific and Engineering Applications, 357-381, Kluwer Academic Publishers (2001), is used to get the local topic model. In one embodiment, the distribution also accounts for at least one of: one or more other documents (e.g., text documents, slide shows, etc.) authored by the node, keywords in an existing node profile and data obtained from other online knowledge sources based on keyword searches (i.e., using keywords in an existing node profile). Thus, the information produced in step 204, for each node, $N_i$, includes: (1) a set of local topics, $L_i$ (where the $j^{th}$ local topic, $L_{ij}$, is a distribution over a set of local keywords); and (2) a probability distribution, $P(L_{ij}|N_i)$ over the local topic set, $L_i$. It will be noted that the supernode or router may generate this information; however, allowing the individual nodes to compute their respective topic distributions preserves the privacy of the documents used to create the topic distributions.

In step 206, the method 200 infers a global topic set, T, from each of the local topic sets $L_i$. In one embodiment, this is achieved by treating the $j^{th}$ local topic, $L_{ij}$, from node, $N_i$, as a point in a distribution manifold over keywords. In one embodiment, information-theoretic probabilistic clustering, for example as described by Dhillon et al. in "Information Theoretic Clustering of Sparse Co-Occurrence Data", Proceedings of the Third IEEE International Conference on Data Mining (ICDM-03), 517-521 (2003), is then performed on these local topics, $L_i$. In another embodiment, constrained information-theoretic probabilistic clustering, for example as described by Basu et al. in "A Probabilistic Framework for Semi-Supervised Clustering", Proceedings of the Tenth ACM SIGKDD International Conference on Knowledge Discovery and Data Mining (KDD-2004), 59-68 (2004), is performed (where cannot-link constraints are added between topics of the same node, in order to prevent topics of a particular node from being clustered together due to uniqueness of a user's vocabulary). Each cluster centroid is then treated as a global topic, $T_k$.

In step 208, the method 200 estimates a node's expertise measure, $E_i$. In order to estimate the expertise measure, $E_i$, the probability distribution $P(T_k|N_i)$ over the global topics is obtained by:

$$P(T_k|N_i)=\Sigma_{L_{ij}}P(T_k|L_{ij},N_i)P(L_{ij}|N_i) \quad \text{(EQN. 2)}$$

where $P(T_k|L_{ij}, N_i)$ can be obtained from the posterior probability of local topic $L_{ij}$ being assigned to the centroid representing global topic $T_k$ in the clustering, while $P(L_{ij}|N_i)$ is obtained from the local topic model of the node, $N_i$ (obtained according to the method mentioned above). Thus, the output of clustering step 208 is the set, T, of global topics and the probability distributions, $P(T_k|N_i)$ for each node, $N_i$, where the probability distribution $P(T_k|N_i)=E_i$ for the node, $N_i$. The method 200 then terminates in step 210.

When a new node enters the network, the local topic model may be run at the new node to generate local topics, $L_j$, which are then assimilated into the global topic set, T (e.g., by re-running the clustering or by assigning new topics to the closest existing clusters). Profiles for existing nodes may be left unchanged or may be adjusted according to social network weights where group preferences or data may affect individual profile information. The expertise measure, $E_i$, for the new node is set in accordance with the output of the clustering algorithm, while the referral rank, $F_i$, and response score, $R_i$, are set to default values.

Figure 3:
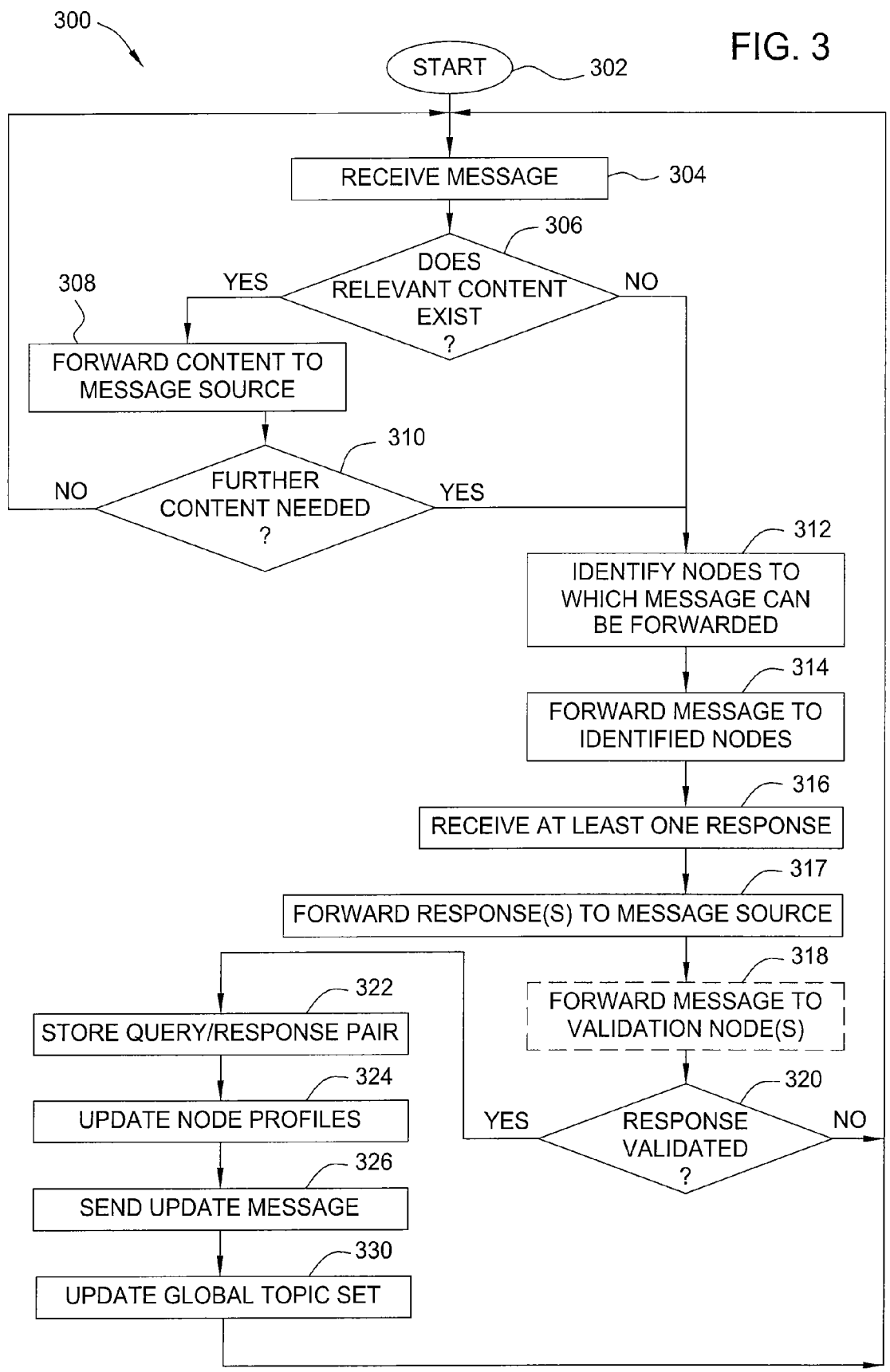
FIG. 3 is a flow diagram illustrating one embodiment of a method for routing messages and learning communication patterns in a distributed network, according to the present invention.

FIG. 3 is a flow diagram illustrating one embodiment of a method 300 for routing messages and learning communication patterns in a distributed network, according to the present invention. In one embodiment, the distributed network is a social network comprising a plurality of interconnected nodes (i.e., users). The method 300 thus may be implemented, for example, by a router or a supernode (e.g., such as the supernode 104 of FIG. 1) deployed within a social network.

The method 300 is initialized at step 302 and proceeds to step 304, where the method 300 receives a message, $m_0$, from a first node or from the system. In one embodiment, the message, $m_0$, is a query. The query may be explicit (e.g., "Has anyone seen an attack involving x, y events?") or implicit (e.g., "I've observed x, y events occurring in association with attacks of type z", where the implied query is, "Who would be interested in this information?").

In step 306, the method 300 determines whether content exists (e.g., in the data repository (index and database), D, maintained by the supernode, with an individual or in an external resource) that is relevant to the received message, $m_0$ (e.g., whether the answer to the query is at hand). For example, the method 300 may search the repository, D, of previous message streams to see if a previous message stream corresponds to the received message, $m_0$ (e.g., addresses the same or a similar query). In one embodiment, the method 300 finds the p best-matching topics from the global topic set, T, for the current message stream segment $m=\{m_0, m_1, \ldots, m_j\}$ (where $m_j$ represents the $j^{th}$ modification to the original message, $m_0$), calculated according to the probability score $P(m|T_k)$. Keywords in the message stream are then augmented with keywords (suitably weighted by their corresponding probabilities) in the top p scoring topic distributions. Similarities are then computed between the current augmented message stream and the existing message streams in the repository. The answers corresponding to the stored message streams with the top match score are then selected as relevant content.

If the method 300 concludes in step 306 that relevant content does exist, the method 300 forwards the relevant content (e.g., the answer) to the message source (i.e., the asking node) in step 308. In step 310, the method 300 determines whether further information should be solicited or retrieved in response to the message (e.g., whether more information is needed to answer the query). In one embodiment, the method 300 determines that further content is needed if the message source does not accept an answer returned in step 308, or otherwise indicates that forwarding of the message, $m_0$, is desired.

If the method 300 concludes in step 310 that no further content is needed, the method 300 returns to step 304 and waits for receipt of the next message, which may be a new query.

Alternatively, if the method 300 concludes in step 310 that further content is needed, the method 300 proceeds to step 312 and identifies one or more other nodes in the network to which the query can be forwarded, i.e., in order to solicit an answer. In one embodiment, the other nodes to which the message, $m_0$, is forwarded are intentionally chosen (for example, in accordance with node profiles or with a forwarding address specified in the message, $m_0$) to increase the chances of receiving a relevant response to the message, $m_0$. That is, the method 300 selects or targets these other nodes based on knowledge of the nodes' respective expertise and/or likelihoods to respond to queries. It should be noted that if the method 300 concludes in step 306 that no content exists that is relevant to the received message, $m_0$, the method 300 proceeds directly to step 312.

In one embodiment, the method 300 selects the nodes to which the message, $m_0$, will be forwarded by computing a ranking score, S, for each node $N_i$ in the network. In one embodiment, the ranking score, $S_i$, of the $i^{th}$ node is computed using a weighted linear combination of the $i^{th}$ node's current referral rank, $F_i$, the node's response score, $R_i$, and the similarity between the topic distributions of the message, $m_0$, and the node's expertise measure, $E_i$, calculated in accordance with EQN. 1. The nodes are then ranked in accordance with their respective ranking scores, S, and the top r nodes are selected for forwarding Once nodes have been identified to whom the message, $m_0$, can be forwarded, the method 300 proceeds to step 314 and forwards the message, $m_0$, to the identified nodes. In step 316, the method 300 receives at least one response to the forwarded message, $m_0$. In one embodiment, a response comprises a proposed answer to the query (e.g., in the form of an answer message). In another embodiment, a response comprises an annotation or comment, $m_k$, to the forwarded message (e.g., in the form of meta-content or tags). In the latter case, the responding node may not know the answer to the query, but may be able to provide information (e.g., topic labels, comments, names of individuals who may know the answer to the query, etc.) to help route the original message, $m_0$, more efficiently or to help locate more relevant information in the database, D. For example, a responding node may annotate a given message related to cancer with the meta-tag "oncology", such that in the future, queries about both "cancer" and "oncology" are able to locate the associated message stream. In this case, modifications to the original message, $m_0$, are represented as $m_j$, where $m_j$ is the $j^{th}$ modification made to the original message, $m_0$ (and a message stream, m, comprises $\{m_0, m_1, \ldots, m_j\}$). In one embodiment, at least one received response originates at one of the nodes to which the original message, $m_0$, was forwarded in step 314. In another embodiment, at least one received response originates at a node who received the original message, $m_0$, from one of the nodes to which the original message, $m_O$, was forwarded in step 314 (i.e., the original message, $m_O$, was further forwarded by one or more of the receiving nodes).

In step 317, the method 300 forwards the response(s) received in step 316 to the message source.

In optional step 318 (illustrated in phantom), the method 300 forwards the message, $m_O$, and response(s) to at least one validation node. A validation node is a node whose expertise is solicited to determine whether a response is a "good" (e.g., accurate or helpful) response relative to the associated message or query. Thus, in one embodiment, validation nodes are specifically chosen or targeted based on their respective expertise and/or likelihood to respond (i.e., "which nodes will most likely be able to determine if this response is good?"). In one embodiment, the method 300 also solicits validation from the sender of the original message, $m_O$. In one embodiment, validation is solicited in the form of a ranking (e.g., "rate the answer on a scale from 1 to 5"). In another embodiment, validation is solicited in the form of a straightforward yes or no answer (e.g., "is the answer correct?"). In one embodiment, the message stream, s, corresponding to the query/answer pair (including all tags and meta-content annotations) are used to index the query/answer pair in the database, D.

In step 320 the method 300 determines whether the response has been validated by the validation nodes. In one embodiment, this determination is made by examining meta-content or tags provided by the validation nodes (i.e., where the meta-content specifies the quality of the responses).

If the method 300 concludes in step 320 that the response has been validated, the method 300 proceeds to step 322 and stores the query/response pair (e.g., in the database, D) for reuse against future queries. In one embodiment, the message/response pair is appended with the validation information and any tags or meta-content added to the original message, $m_O$. Thus, in this case, the method 300 stores the entire message stream, s, from the original message, $m_O$, through the last-made modification, $m_j$.

In step 324, the method updates the node profile for any nodes involved in the routing and answering of the message, $m_O$. Specifically, the method 300 updates the expertise measure, $E_i$, and the response score $R_i$ for each node that participated in the message stream, m, that generated the response (e.g., nodes that answered and/or validated the query). In one embodiment, the method 300 updates the probabilities $P(T_k|N_i)$ in the expertise measure, $E_i$. For every message segment, $m_j$, generated by a node, $N_i$, in the message stream, m, the posterior probability $P(T_k|N_i, m_j)$ on observing the message, m, is calculated as:

$$P(T_k|N_i,m_j) \propto P(m_j|T_k) \cdot P(T_k|N_i) \qquad \text{(EQN. 3)}$$

After renormalization, these posterior probabilities $P(T_k|N_i, m_j)$ constitute the updated expertise measure, $E_i$, for each message segment, $m_j$.

The method 300 updates the referral rank, $F_i$, for nodes involved in the routing of the message stream, s (e.g., nodes that forwarded the query to the nodes that answered and/or validated the query). In one embodiment, the referral rank, $F_i$, is updated using an algorithm similar to an incremental page rank algorithm commonly used by Internet search engines. The method 300 then proceeds to step 326 and sends an update message to the nodes involved in the routing and answering, so that these nodes may update their profiles locally.

In one embodiment, a node's profile may be negatively updated (i.e., one or more parameters may be decremented) if the response is not validated or is determined by the validation node(s) to be incorrect.

In step 328, the method 300 updates each topic $T_k$, in the global set, T, of topics. In one embodiment, topics, $T_k$, are updated by:

$$T_k = T_k + P(s|T_k) \cdot \frac{s}{|s|} \qquad \text{(EQN. 4)}$$

where $s_m$ is the set of keywords in the message stream, s, that has just been answered. $T_k$ is then renormalized to be a probability distribution. In this way, every topic, $T_k$, is updated according to its probability of producing the message stream, s. In one embodiment, a Bayesian model is used to normalize topic updates (since each topic, $T_k$, is a distribution over entries such as keywords). The method 300 then returns to step 304 and awaits the next message.

Alternatively, if the method 300 concludes in step 320 that the response has not been validated, the method 300 returns to step 304 and awaits a next message (e.g., a next response to the query). In one embodiment, the method 300 iterates until at least one correct or useful response (e.g., as assessed by one or more validation nodes) is returned to the query source.

Thus, the method 300 integrates query and content generation functions by soliciting responses to queries from other nodes (i.e., other than the requesting node) in the network. This integration provides at least two fundamental benefits. Firstly, if content relevant to a given query is not available (e.g., either globally or in a local cache), the method 300 supports a powerful, demand-driven mechanism for generating relevant content. Secondly, even if relevant content is available, the method 300 provides a mechanism for creating additional or improved indexing for this content, which makes the content easier to find by context-specific queries. By saving query/answer pairs (and their associated appendices), the method 300 is able, in substantially real time, to build a "map" of a network that identifies nodes having hub (i.e., knows which other nodes to which to route messages) and authority (i.e., has the expertise to answer messages) characteristics useful for routing of future messages.

The present invention therefore enables a social network to do different kinds of work, including question answering, observation routing, team formation (i.e., finding groups of nodes with particular associations to some query) and information validation/assessment. By integrating communications and search, the present invention supports a dynamically evolving search engine that both indexes and generates information at a high level of granularity. This is accomplished by tapping into the distributed expertise and actions of the underlying social network. The method 300 could therefore be used to generate a database of frequently asked questions (FAQs) or to generate anchor text for World Wide Web pages.

In one embodiment, the global topic set, T, is represented in inverted indices. In one embodiment, there are two indices: (1) a first index, $I_1$, for mapping keywords, w, to topics, T; and (2) a second index, $I_2$, for mapping topics, T, to nodes, N. In this way, when a new message, m, is generated in the network, the first index, $I_1$, takes the message, m, as input and outputs a vector of weighted topics, t, relevant to the message, m. The second index, $I_2$, then takes the vector of weighted topics, t, as input and outputs a weighted vector of relevant nodes. These relevant nodes may then be ranked in accordance with their relevance to the message, $m_O$. The use of the inverted indices $I_1$ and $I_2$ allows the methods of the present invention to be scaled to accommodate larger numbers of nodes and larger global topic sets.

Figure 4:
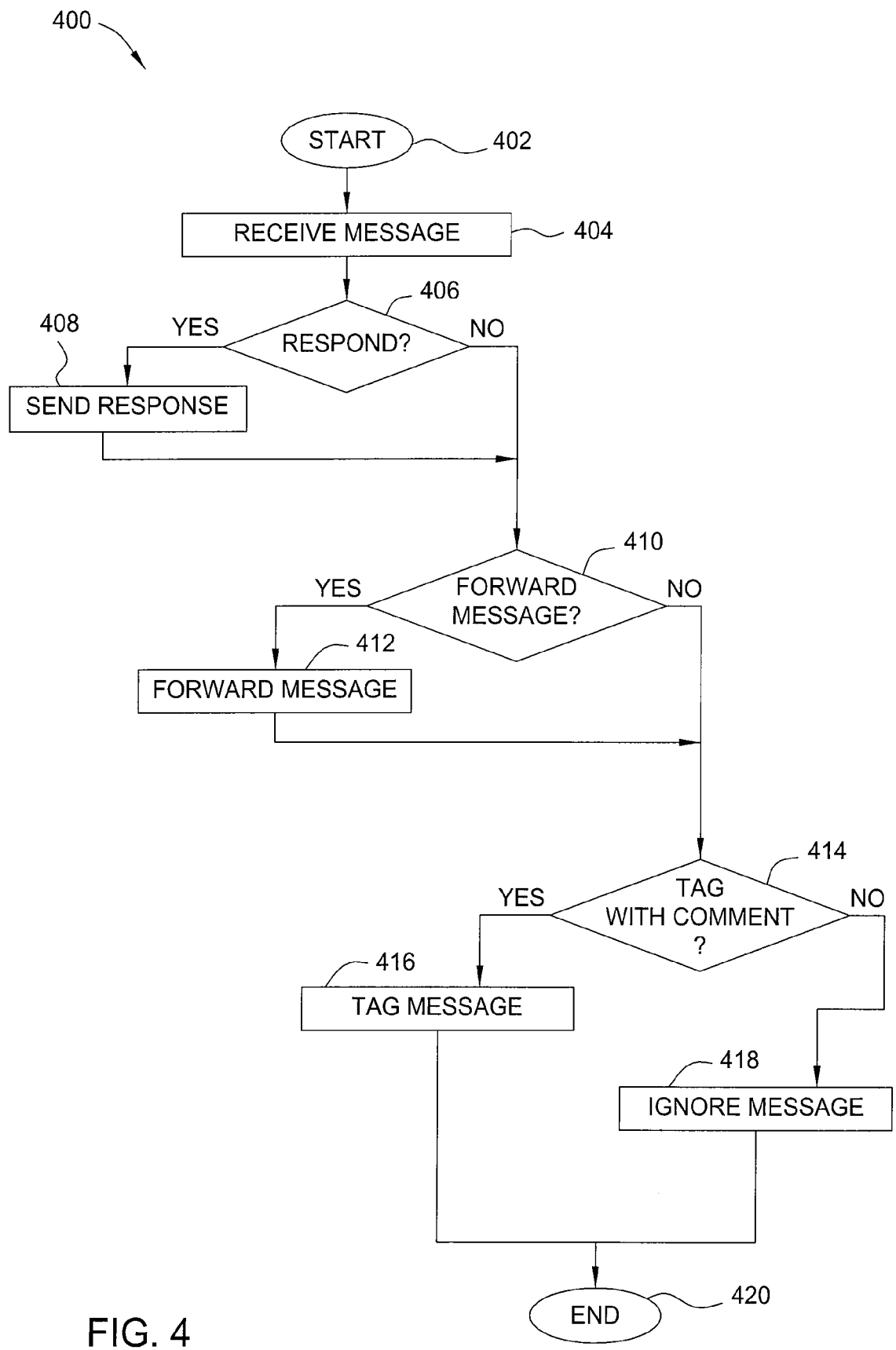
FIG. 4 is a flow diagram illustrating one embodiment of a method for processing a message, according to the present invention.

FIG. 4 is a flow diagram illustrating one embodiment of a method 400 for processing a message, according to the present invention. The method 400 may be implemented, for example, at a node in a social network.

The method 400 is initialized at step 402 and proceeds to step 404, where the method 400 receives a message (e.g., from a router or from another node or supernode). In one embodiment, the message includes a query (either explicit or implicit). In another embodiment, the message is a solicitation to validate an answer provided by another node in response to a query.

In step 406, the method 400 determines whether to respond to the message (e.g., with an answer to a query or with validation feedback). If the method concludes in step 406 that a response should be sent, the method 400 sends a response in step 408. A tag of the response is set to "answer" to indicate that it is a response to the message received in step 404. The method 400 then proceeds to step 410 and determines whether to forward the received message (e.g., to another node that is believed capable of responding to the message or capable of forwarding the message to another node that can respond). Alternatively, if the method 400 concludes in step 406 that a response should not be sent, the method 400 proceeds directly to step 410.

If the method 400 concludes in step 410 that the message should be forwarded, the method forwards the message to one or more other nodes in step 412. Additionally, a tag of the message is set to "forward" to indicate that the message is being forwarded. In one embodiment, the tag indicates "forward to forward" (i.e., forward to another node who may be able to forward the message to a node who can respond). In another embodiment, the tag indicates "forward to answer" (i.e., forward to another node who may be able to respond to the message).

The method 400 then proceeds to step 414 and determines whether the message should be tagged with a comment. In one embodiment, a comment is neither an answer nor a forwarding suggestion, but may help in characterizing the message for more efficient routing in the network (e.g., by suggesting alternate keywords, topics, etc.). In another embodiment, the comment may solicit clarification of the message received in step 404. In another embodiment still, the comment may simply indicate that the commenting node is interested in future replies to the message. Alternatively, if the method 400 concludes in step 410 that the message should not be forwarded, the method 400 proceeds directly to step 414.

If the method 400 concludes in step 416 that the message should be tagged with a comment, the method 400 proceeds to step 416 and tags the message with the comment before terminating in step 420. Thus, the tag of the message is set to "comment" to indicate that another node has commented on the message.

Alternatively, if the method 400 concludes in step 414 that the message should not be tagged, the method 400 proceeds to step 418 and ignores (i.e., discards) the message before terminating in step 420. In this case, a tag of the message is set to "ignore" to indicate that the node is taking no action with respect to the message.

In this manner, the method 400 allows a node to provide valuable feedback (i.e., in the form of messages and meta-content) that enables a router or supernode to learn (by watching and recording) the node's expertise, preferences, and likelihood to respond to messages over subsequent iterations. This information may then be used to route messages more efficiently in the future. As discussed above, the action or actions that are taken in accordance with the method 400 will impact a node's profile in the network. For example, if the node chooses to ignore a message, the node's expertise measure, $E_i$, referral rank, $F_i$, and response score, $R_i$, may be decremented, at least with regard to the topic that is the subject of the message (i.e., this node is not the node to whom to direct queries dealing with this topic). If the node responds with an answer that is validated, the node's expertise measure, $E_i$, referral rank, $F_i$, and response score, $R_i$, may be incremented, at least with regard to the topic that is the subject of the message (i.e., this node is a good node to whom to direct queries dealing with this topic). If the node forwards the message to a node who later responds with a validated answer, the forwarding node's referral rank, $F_i$, and response score, $R_i$ may be incremented (i.e., this node knows someone who is a good node to whom to direct queries dealing with this topic).

Figure 5:
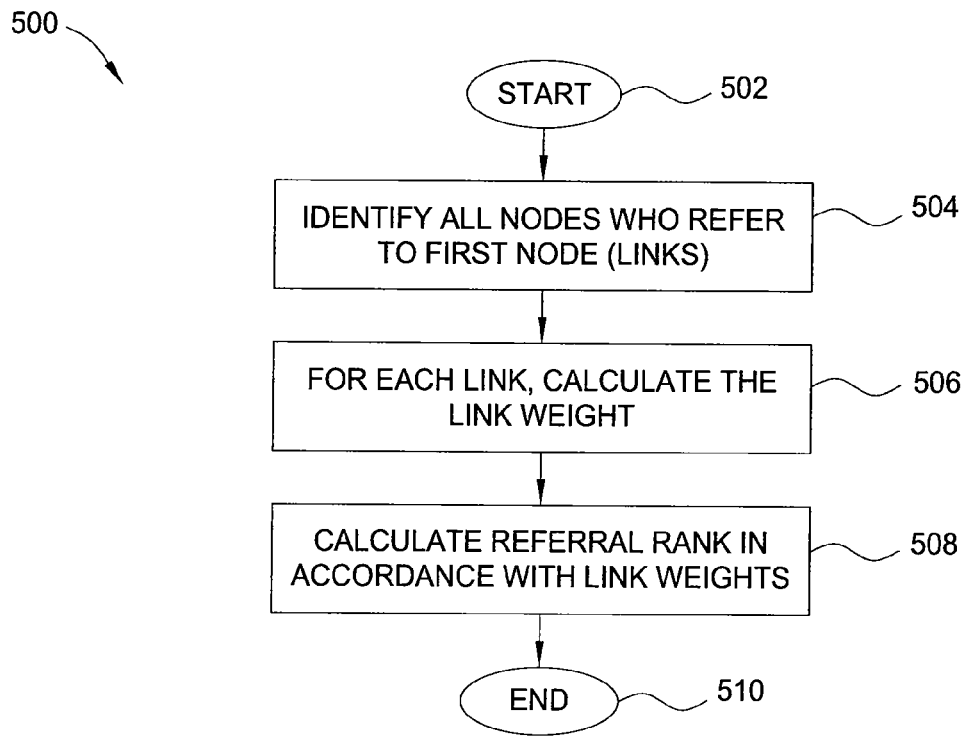
FIG. 5 is a flow diagram illustrating one embodiment of a method for determining a first node's referral rank, according to the present invention.

FIG. 5 is a flow diagram illustrating one embodiment of a method 500 for determining a first node's referral rank, $F_i$, according to the present invention. The first node's referral rank, $F_i$, may change dynamically based on the affinity of other nodes to refer messages to the first node. Thus, the method 500 may be executed (for example, by a router or supernode) over time as messages are forwarded and tagged in the network.

Figure 6:
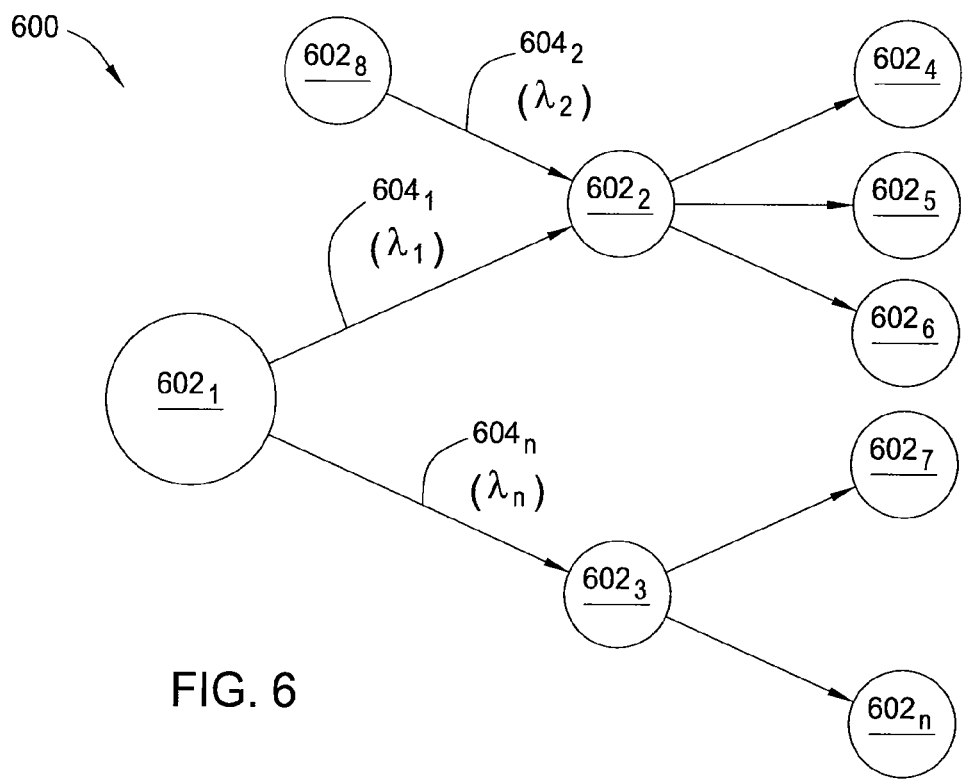
FIG. 6 is a schematic diagram illustrating an exemplary network.

The method 502 is initialized at step 502 and proceeds to step 504, where the method 500 identifies all nodes in the network that refer to the first node. That is, the method 500 identifies all referral links to the first node. For example, referring to FIG. 6, which is a schematic diagram illustrating an exemplary network 600, links $604_1$ and $604_2$ comprise referral links to node $602_2$ (from, respectively, node $602_1$ and node $602_8$).

Once all referral links to the first node have been identified, the method 500 proceeds to step 506 and calculates a link weight, $\lambda$, for each link. The link weight, $\lambda$, defines a relative affinity of a referring node to refer messages to the first node. For example, referring again to FIG. 6, one of the nodes that refers messages to node $602_2$ is node $602_1$. Node $602_1$ also refers messages to node $602_3$ (via referral link $604_n$). However, node $602_1$ may not necessarily refer messages to node $602_3$ as often as node $602_1$ refers messages to node $602_2$. The link weights $\lambda_1$ and $\lambda_n$ reflect the relative likelihood of the referring node (i.e., node $602_1$) to refer messages to nodes $602_2$ and $602_3$ (for example, node $602_1$ may refer messages to node $602_2$ sixty percent of the time and to node $602_3$ forty percent of the time).

In step 508, the method 500 calculates the referral rank, $F_i$, of the first node, $N_i$, in accordance with the link weights. In one embodiment, the referral rank, $F_i$, is calculated as the sum of the referral ranks of referring nodes weighted by the corresponding link weights associated with the first node. Thus, in FIG. 6, the referral rank, $F_i$, of node $602_2$ would be the weighted sum of the referral ranks from $604_1$ and $604_2$ (e.g., $\lambda_1 * F1 + \lambda_2 * F2$). This process is iteratively repeated until the referral ranks converge. The method 500 then terminates in step 510.

The response score, Ri, of a node also is likely to change dynamically over time, as the node responds to messages. As described above, the response score may account not just for the frequency with which a node responds, but also for the accuracy of the responses (e.g., as assessed by validating nodes). Thus, in one embodiment, the response score, $R_i$, of a node at any given time is calculated as:

$$\frac{\text{number of correct responses by the node}}{\text{number of total requests from other nodes including super node}} \quad \text{(EQN. 5)}$$

Figure 7:
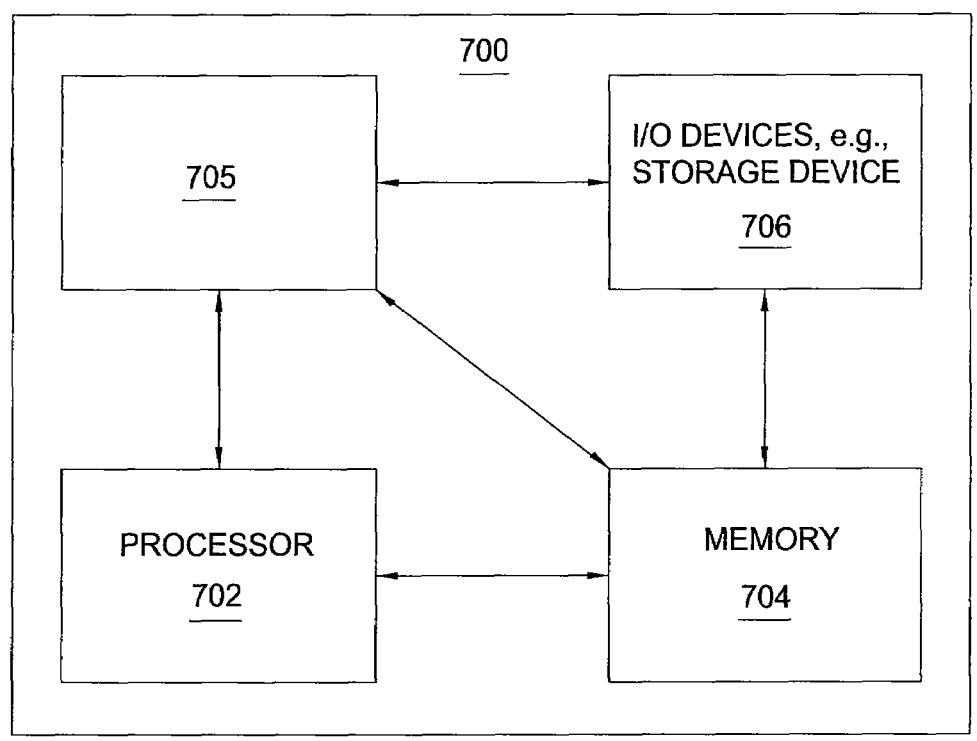
FIG. 7 is a high level block diagram of the message routing method that is implemented using a general purpose computing device.

FIG. 7 is a high level block diagram of the message routing method that is implemented using a general purpose computing device 700. In one embodiment, a general purpose computing device 700 comprises a processor 702, a memory 704, a message routing module 705 and various input/output (I/O) devices 706 such as a display, a keyboard, a mouse, a modem, and the like. In one embodiment, at least one I/O device is a storage device (e.g., a disk drive, an optical disk drive, a floppy disk drive). It should be understood that the message routing module 705 can be implemented as a physical device or subsystem that is coupled to a processor through a communication channel.

Alternatively, the message routing module 705 can be represented by one or more software applications (or even a combination of software and hardware, e.g., using Application Specific Integrated Circuits (ASIC), Field Programmable Gate Arrays (FPGAs) or Digital Signal Processors (DSPs)), where the software is loaded from a storage medium (e.g., I/O devices 706) and operated by the processor 702 in the memory 704 of the general purpose computing device 700. Thus, in one embodiment, the message routing module 705 for performing targeted routing of messages described herein with reference to the preceding Figures can be stored on a computer readable medium or carrier (e.g., RAM, magnetic or optical drive or diskette, and the like).

Although described herein within the context of a socially-mediated content generation and routing application, the methods of the present invention also have application in fields including medical advice, online tutoring, help-desk applications (e.g., within an enterprise) and collaborative problem-solving (e.g., for large-scale scientific research efforts), among others.

Thus, the present invention represents a significant advancement in the field of distributed networks. Embodiments of the invention learn, and then exploit, patterns of communication (e.g., as expressed in linkages and message contents) in an underlying social network in order to improve searching capabilities within the network. Moreover, the present invention provides a means of validating the answers generated in response to a query posed within a social network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing messages in a social network, the method performed by a computer processor and comprising:
   algorithmically deriving, by the computer processor, for each node in the social network, a first metric representing an expertise of a human user of the node regarding one or more corresponding topics;
   algorithmically deriving, by the computer processor, for each node in the social network, a second metric representing: an affinity of one or more other nodes in the social network to refer messages to the node and a likelihood of the human user of the node to respond to a message;
   receiving a new message from a first node in the social network, the new message including a query;
   providing the first node with content responsive to the query, when the content is found in a data repository;
   determining a relevant topic to which the query relates;
   algorithmically identifying, by the computer processor, one or more candidate nodes in the social network to which to refer the query, based at least in part on the first metric and the second metric derived for each of the candidate nodes; and
   initiating generation of a response to the query, at least when the content is not found in the data repository, wherein the initiating comprises forwarding the message to at least one of the candidate nodes.

2. The method of claim 1, wherein the query is explicit.

3. The method of claim 1, wherein the query is implicit.

4. The method of claim 1, wherein the providing comprises:
   identifying a previous message that is related to the new message; and
   returning an answer corresponding to the previous message as the content.

5. The method of claim 1, wherein the first metric and the second metric are associated with a profile of a corresponding node.

6. The method of claim 5, further comprising:
   receiving a response message from at least one of the candidate nodes in response to the new message;
   providing the response message to the first node; and
   soliciting feedback from one or more validation nodes, the feedback relating to a quality of the response message.

7. The method of claim 6, further comprising:
   storing the new message and the response message in the data repository, if the feedback is positive.

8. The method of claim 6, wherein the one or more validation nodes are selected in accordance with one or more profiles of the respective one or more validation nodes.

9. The method of claim 6, further comprising:
   globally updating the profile of the at least one of the candidate nodes in accordance with at least one of: the response message or the feedback.

10. The method of claim 9, further comprising:
    sending an update message to the at least one of the candidate nodes, the update message instructing the at least one of the candidate nodes to update the profile of the at least one of the candidate nodes locally in accordance with the global update.

11. The method of claim 1, wherein the second metric further indicates a likelihood of the human user of the node to respond to a message with a correct answer.

12. The method of claim 1, wherein the second metric is non-topic-specific.

13. A non-transitory computer readable medium containing an executable program for processing messages by a computer processor in a social network, where the program performs steps of:
    algorithmically deriving, by the computer processor, for each node in the social network, a first metric representing an expertise of a human user of the node regarding one or more corresponding topics;
    algorithmically deriving, by the computer processor, for each node in the social network, a second metric representing: an affinity of one or more other nodes in the social network to refer messages to the node and a likelihood of the human user of the node to respond to a message;

receiving a new message from a first node in the social network, the new message including a query;

providing the first node with content responsive to the query, when the content is found in a data repository;

determining a relevant topic to which the query relates;

algorithmically identifying, by the computer processor, one or more candidate nodes in the social network to which to refer the query, based at least in part on the first metric and the second metric derived for each of the candidate nodes; and initiating generation of a response to the query, at least when the content is not found in the data repository, wherein the initiating comprises forwarding the message to at least one of the candidate nodes.

14. The non-transitory computer readable medium of claim 13, wherein the query is explicit.

15. The non-transitory computer readable medium of claim 13, wherein the query is implicit.

16. The non-transitory computer readable medium of claim 13, wherein the providing comprises:

identifying a previous message that is related to the new message; and returning an answer corresponding to the previous message as the content.

17. The non-transitory computer readable medium of claim 13, wherein the first metric is associated with a profile of a corresponding node.

18. The non-transitory computer readable medium of claim 17, further comprising:

receiving a response message from at least one of the candidate nodes in response to the new message;

providing the response message to the first node; and soliciting feedback from one or more validation nodes, the feedback relating to a quality of the response message.

19. The non-transitory computer readable medium of claim 18, further comprising:

storing the new message and the response message in the data repository, if the feedback is positive.

20. The non-transitory computer readable medium of claim 18, wherein the one or more validation nodes are selected in accordance with one or more profiles of the respective one or more validation nodes.

21. The non-transitory computer readable medium of claim 18, further comprising:

globally updating the profile of the at least one of the candidate nodes in accordance with at least one of: the response message or the feedback.

22. The non-transitory computer readable medium of claim 21, further comprising:

sending an update message to the at least one of the candidate nodes, the update message instructing the at least one of the candidate nodes to update the profile of the at least one of the candidate nodes locally in accordance with the global update.

23. The non-transitory computer readable medium of claim 13, wherein the response score further indicates a likelihood of the human user of the corresponding node to respond to a message with a correct answer.

24. The non-transitory computer readable medium of claim 13, wherein the second metric is non-topic-specific.

25. A system for processing messages in a social network, comprising:

a computer processor, comprising:

means for algorithmically deriving, by the computer processor, for each node in the social network, a first metric representing an expertise of a human user of the node regarding one or more corresponding topics;

means for algorithmically deriving, by the computer processor, for each node in the social network, a second metric representing: an affinity of one or more other nodes in the social network to refer messages to the node and a likelihood of the human user of the node to respond to a message;

means for receiving a new message from a first node in the social network, the new message including a query;

means for providing the first node with content responsive to the query, when the content is found in a data repository;

means for determining a relevant topic to which the query relates;

means for algorithmically identifying, by the computer processor, one or more candidate nodes in the social network to which to refer the query, based at least in part on the first metric and the second metric derived for each of the candidate nodes; and means for initiating generation of a response to the query, at least when the content is not found in the data repository, wherein the initiating comprises forwarding the message to at least one of the candidate nodes.

* * * * *